United States Patent [19]
Poisner

[11] Patent Number: 6,108,785
[45] Date of Patent: Aug. 22, 2000

[54] METHOD AND APPARATUS FOR PREVENTING UNAUTHORIZED USAGE OF A COMPUTER SYSTEM

[75] Inventor: David I. Poisner, Folsom, Calif.

[73] Assignee: Intel Corporation, Santa Clara, Calif.

[21] Appl. No.: 08/829,114

[22] Filed: Mar. 31, 1997

[51] Int. Cl.[7] .................................................. G06F 11/30
[52] U.S. Cl. ........................ 713/200; 713/201; 713/202
[58] Field of Search ........................... 395/186, 188.01; 713/200, 202, 324; 380/25

[56] References Cited

U.S. PATENT DOCUMENTS

| | | | |
|---|---|---|---|
| 3,863,223 | 1/1975 | Gossett | 395/186 |
| 4,298,792 | 11/1981 | Granholm et al. | 235/375 |
| 4,458,315 | 7/1984 | Uchenick | 380/4 |
| 5,323,149 | 6/1994 | Hoult et al. | 340/825.54 |
| 5,388,211 | 2/1995 | Hornbuckle | 395/712 |
| 5,485,622 | 1/1996 | Yamaki | 395/186 |
| 5,590,199 | 12/1996 | Krajewski, Jr. et al. | 380/25 |
| 5,774,546 | 6/1998 | Handelman et al. | 380/4 |
| 5,781,724 | 7/1998 | Nevarez et al. | 395/186 |
| 5,887,131 | 3/1999 | Angelo | 713/202 |
| 5,949,882 | 9/1999 | Angelo | 380/25 |

*Primary Examiner*—Meng-Ai T. An
*Assistant Examiner*—Nabil El-Hady
*Attorney, Agent, or Firm*—Blakely, Sokoloff, Taylor & Zafman, LLP

[57] ABSTRACT

A security apparatus interfacing with a first device for preventing unauthorized use of a second device, the security apparatus including a first circuit configured to generate an event and a second circuit configured to provide an input to the first device in response to each the event, to receive a response from the first device in response to the input, and to assert a signal to disable the second device if the response does not correspond to an expected response.

22 Claims, 2 Drawing Sheets

METHOD AND APPARATUS FOR PREVENTING UNAUTHORIZED USAGE OF A COMPUTER SYSTEM

BACKGROUND OF THE INVENTION

1. Field of the Invention

The present invention relates to the field of security systems; more particularly, the present invention relates to a method and apparatus for preventing unauthorized usage of a device, such as a computer system.

2. Description of Related Art

A computer system typically includes a mass storage device, such as a hard disk drive, which is often used to store confidential information. The value of maintaining the confidentiality of the information often far exceeds the value of the computer system itself.

Some computer systems utilize password protection to prevent unauthorized access to confidential information. Before access to the information is granted by the computer system, the user is required to enter a password, preferably known only to authorized users. One problem with password protection is that many passwords are learned by unauthorized users by numerous well known methods, such as overhearing the password being told to someone, overseeing the password being typed, or determining the password through the use of software tools that make numerous guesses until access is granted. Alternatively, password protection may often be defeated by modifying software, such as the operating system, or replacing or rewriting the bidirectional input/output system (BIOS), for example, to bypass the password request routine. Thus, password protection may not provide an adequate level of protection against unauthorized access when considering the potential value of the information stored in the computer system.

Some computer systems utilize a mechanical lock that acts as a switch to control access to the mass storage device. Before access to the information is granted by the computer system, the user is required to use a mechanical key to turn the lock to the active position. One problem with a mechanical lock is that such a system may be defeated by stealing or duplicating the mechanical key. Alternatively, the mechanical lock may be bypassed through relatively simple mechanical or electrical means, such as picking the lock or shorting the open circuit of the mechanical lock in the inactive position. Thus, mechanical lock protection may not provide an adequate level of protection against unauthorized access when considering the potential value of the information stored in the computer system.

What is needed is a method and apparatus to prevent unauthorized access of a computer system such that the method and apparatus is less susceptible to unauthorized access than a password and/or a mechanical lock.

SUMMARY OF THE INVENTION

A security apparatus interfacing with a first device for preventing unauthorized use of a second device, the security apparatus including a first circuit configured to generate an event and a second circuit configured, to provide an input to the first device in response to the event, to receive a response from the first device in response to the input, and to assert a signal to disable the second device if the response does not correspond to an expected response.

DETAILED DESCRIPTION

Figure 1:
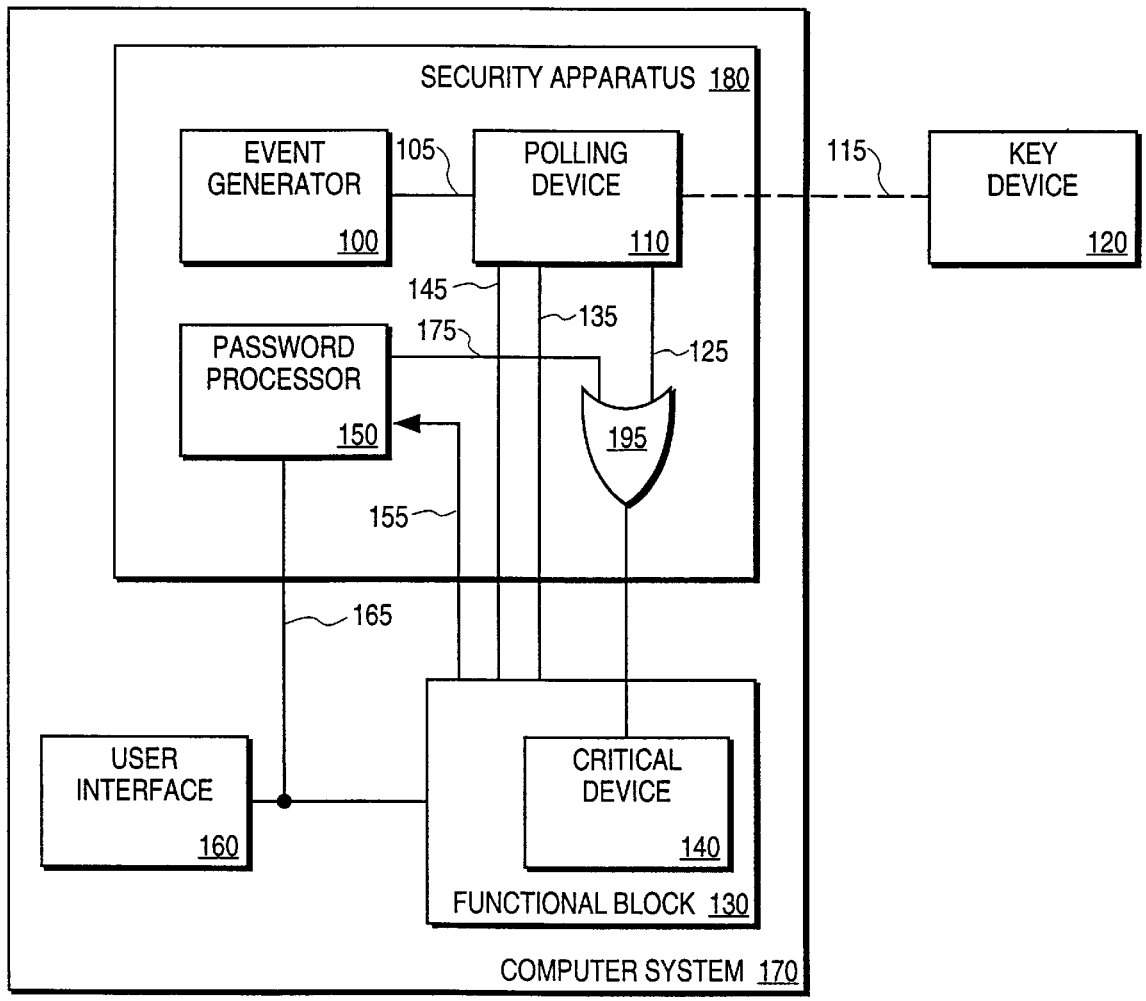
FIG. 1 illustrates computer system including a security apparatus.

The present invention provides a method and apparatus to prevent unauthorized access of a computer system such that the method and apparatus is less susceptible to unauthorized access to a password and/or means to defeat a mechanical lock.

A key device is used to identify an authorized user. The key device includes logic to process input data and transform the input data to output data according to a predetermined algorithm. A security apparatus provides a random input data to the key device in response to an event signal, receives the output data from the key device, and verifies that the output data matches the expected result of the algorithm applied to that input data. The algorithm is sufficiently complex so as to prevent determination of the algorithm by unauthorized users. The methods of selecting such algorithms are well-known.

If the output data from the device does not match the expected result of the algorithm, the security apparatus controls a critical component of the secured device, such as a computer system, to prevent access. For example, a critical component may be the power supply of the computer system. The computer system may either disable the power supply or cause the computer system to enter a non-operational low-power mode. Alternatively, the critical component may be the hard disk drive which may contain protected information. Thus, for example, the computer system may disable access to a portion of the hard disk drive or shut down the hard disk. In yet another embodiment, a critical component may be a bus within the computer system such that the computer system cannot substantially operate without the use of that bus.

If the output data from the device does match the expected result of the algorithm, the security apparatus controls the critical component of the secured device to enable access.

The security device is preferably implemented in hardware other than the processor of the secured device such that it cannot be disabled by the user through the secured device. The security device is therefore distinguished from polling routines that are implemented in software that may often be defeated by modifying software, such as the operating system, or replacing or rewriting the bidirectional input/output system (BIOS), for example. In addition, a security device implemented in hardware is not vulnerable to software viruses.

In order to provide security against lost, stolen, or counterfeit key devices, a password processor is preferable. The password processor requests a password through a user-interface upon an event, such as the powering up of the secured device. If the proper password is not provided promptly, access to the computer system is denied, preferably as described above. The password processor is preferably implemented in hardware other than the CPU such that it cannot be disabled by the user through the secured device. The password processor is therefore distinguished from password routines that are implemented in software that may often be defeated by modifying software, such as the operating system, or replacing or rewriting the bidirectional input/output system (BIOS), for example. In addition, a password processor implemented in hardware is not vulnerable to software viruses.

FIG. 1 illustrates an embodiment of the security apparatus of the present invention. FIG. 1 also illustrates a computer system 170 comprising the security apparatus 180. A functional block 130 of the computer system may include a processor subsystem, random access memory (RAM), and a mass storage device, such as a hard disk drive or FLASH electrically erasable programmable read-only memory (EEPROM). It will be apparent to one skilled in the art that many well-known components of a computer system are not illustrated here to avoid obscuring the present invention.

An event generator 100 is used to generate an event signal on an event bus 105. A polling device 110 is coupled to the event bus 105, a communication channel 115, and a control bus 125. The polling device uses the communication channel 115 to check for the presence of an authentic key device 120 in response to each assertion of the event signal. If a key device is not detected or a key device is detected but not authenticated, a disable signal is asserted on the control bus 125.

In one embodiment, the event generator 100 is an periodic event generator comprising an oscillator, for example. In another embodiment, the event generator 100 comprises a real-time clock and logic to periodically assert the event signal in response to an output of the real-time clock. In another embodiment, the event generator 100 is configured to assert the event signal before resuming system activity after an idle period since there can be no security breaches without system activity. At least a portion of the event generator 100, such as the real-time clock, may be part of an external device, such as a computer system. However, such a configuration may permit the real-time clock to be disabled through software or hardware control, for example. Therefore, the preferred embodiment of the event generator 100 comprises components that are dedicated to the security apparatus 180 such that software or hardware controls cannot disable the generation of the periodic signal beyond powering down the computer system. In one embodiment, the period of the event signal is approximately 0.5 seconds. A smaller period may yield higher security at the expense of system performance and a larger period may yield reduced security with increased system performance. It will be apparent to one skilled in the art that the event signal may have other periods.

In one embodiment, the key device 120 is a Personal Computer (PC) card and the communications channel 115 is a PC bus slot. In another embodiment, the key device 120 uses a two-wire protocol such as a System Management Bus (SMBus), an Inter-Integrated Circuit $I^2C$ bus, or a PS/2 keyboard or mouse interface (a trademark of International Business Machines Corporation). In another embodiment, the key device 120 is a parallel port device and the communications channel 115 is a parallel port. Alternatively, the key device 120 is a wireless device and the communications channel 115 is a medium for electromagnetic transmission. A wireless key device 120 may be maintained on an authorized user's person such that access to the computer is permitted simply when his person is in the transmission range of the polling device 110. It will be apparent to one skilled in the art that any means of communication between two devices may be used as the communication channel 115.

The key device 120 has logic to process input data and transform it to output data according to a predetermined algorithm. The polling device 110 provides a random input data to the key device 120 in response to an event signal, receives the output data from the key device 120, and verifies that the output data matches the expected result of the algorithm. The polling device 110 comprises logic to generate random input data and logic to compute the expected output data of the algorithm. The algorithm is sufficiently complex so as to prevent determination of the algorithm by unauthorized users.

If the output data from the device does not match the expected result of the algorithm, a disable signal is asserted on the control bus 125. If the output data from the device does match the expected result of the algorithm, the disable signal is deasserted on the control bus 125.

In one embodiment, the polling device 110 polls the key device 120 through the communication channel 115 to determine a security level, which is stored on the key device 120, and provides that information to the secured device on the security level bus 135, which is coupled to the polling device 110. Part of the information encoded onto the key device 120 is the security level for that particular key device 120. In one embodiment, the polling device 110 tests for one of a plurality of expected output data values (the result of a corresponding algorithm applied to the same input data). Each expected output data is associated with a different security level. If the output data matches one of these expected output data values, access to the secured device is permitted at the corresponding security level. If the output data does not match the expected output data value, the disable signal is asserted to prevent access to the secured device. Other methods of encoding the security level on the key card 120 may be used. Thus, different users may be assigned key devices with different levels of access to the secured device. For example, users with the highest security level may be granted complete access whereas each successively lower security level may be granted access to fewer devices and/or more limited portions of the memory.

The security level is requested in response to each assertion of the event signal. Alternatively, the security level is requested each time the security apparatus 180 detects a new key device 120 coupled to the communications channel 115. Other methods of determining when to poll the key device 120 for the security level may be used.

In one embodiment, the polling device 110 receives information from the secured device on the information bus 145 and transmits that information on the communications channel 115 to the key device 120. The key device 120 may store or otherwise process this information. This information may include an identification of the secured device that was being accessed with this particular key device 120 or a description of one or more activities being performed on the secured device, for example. This may provide the user of the key device 120 a record of his presence and activity on the secured device. For example, this information may be recorded to document the time and productivity of a computer operator or provide proof of a banking related transaction on a computer system or a cash machine. In addition, the polling device 110 may also receive information from the key device 120 on the communications channel and transmit this information to the secured device on the information bus 145. For example, this information may uniquely identify the user such that information regarding the usage and activities performed by this user may be recorded by the secured device.

In one configuration, the security apparatus 180 also includes a password processor 150 which initiates a request for a password on the bus 165 in response to an event signal on an event bus 155. The bus 165 is coupled to a user-interface 160, which may include a video display to prompt the user and a keyboard for the user to provide the password. However, other prompting devices, such as a speaker for an audio prompt, and other input devices, such as a microphone coupled with speech recognition software, may be used. In one embodiment, the event signal is asserted once the secured device is operational after powering up. However, other events may be used to cause the event signal to be asserted.

If the user fails to promptly provide the appropriate password, a disable signal is asserted on the control bus 175. If the user promptly provides the appropriate password, a disable signal is deasserted on the control bus 175. The control bus 175 and the control bus 125 are coupled to the inputs of an or gate 195 to generate a disable signal on the control bus 185.

In one embodiment, the control bus 185 is coupled to a critical device 140 within the functional block 130 to disable its functionality when the disable signal is asserted. Alternatively, the critical device 140 may be coupled directly to the control bus 125 and/or the control bus 175. A critical device 140 is selected such that the computer system 170 cannot fully function when this critical device 140 is disabled. It will be apparent to one skilled in the art that the degree of non-functionality of the computer system 170 in response to the disable signal is a matter of engineering choice. Preferably, the computer system 170 is disabled at least to the degree that confidential information cannot be accessed. In one embodiment, the critical device 140 comprises a mass storage device in which access to the mass storage device is disabled in response to the disable signal. In another embodiment, the security level signal is used to determine which portions of the mass storage device may be accessed. Different portions of the mass storage device may contain information that is more or less confidential than other portions. In another embodiment, the critical device 140 comprises an internal system bus in which the internal system bus is disabled in response to the disable signal. In still another embodiment, the critical device 140 is the power supply of the computer system 140 in which the power provided by the power supply is reduced or eliminated in response to the disable signal. In yet another embodiment, the disable signal causes the computer system to enter a standby mode.

In yet another embodiment, the security apparatus 180 is integrated onto other secured devices, such as the mass storage device itself. Although the present invention is discussed in context of a computer system, it will be apparent to one skilled in the art that the present invention may be applied to any device capable of being disabled or otherwise controlled, such as a cellular phone, automobile, or electronic door locks.

Figure 2:
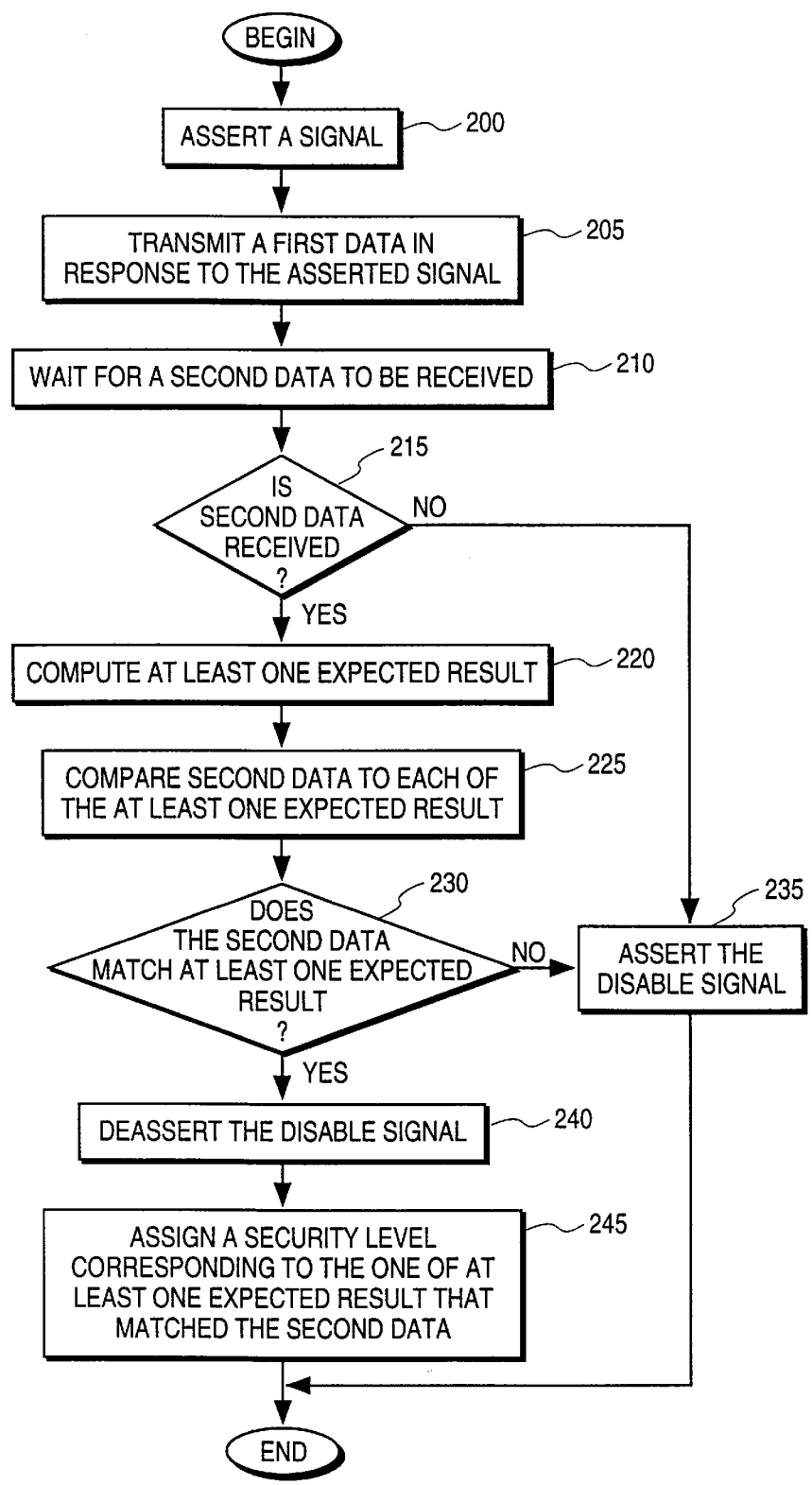
FIG. 2 illustrates a method of securing a device, such as a computer system.

FIG. 2 illustrates an embodiment of a method for securing a device, such as a computer system.

In step 200, an event signal is asserted. In one embodiment, the event signal is a periodically asserted signal with a period of approximately 0.5 seconds. However, it will be apparent to one skilled in the art that the event signal may have other periods. In another embodiment, the signal is asynchronously generated before resuming system activity after an idle period since there can be no security breaches without system activity.

In step 205, a first data is provided in response to an assertion of the event signal. In one embodiment the first data includes information provided in response to an assertion of the event signal. The key device may store or otherwise process this information. This information may include an identification of the secured device that was being accessed with this key device or a description of one or more activities being performed on the secured device, for example. This may provide the user of the key device a record of his presence and activity on the secured device.

In step 210, a period of time is provided for a second data to be received in response to the receipt of the first data. The second data corresponds to the output of an algorithm applied to the first data. In one embodiment, the second data corresponds to one of a plurality of expected output data values (the result of a corresponding algorithm applied to the same input data). Each expected output data is associated with a different security level. The period of time provided is a matter of engineering choice.

In step 215, it is determined whether the second data is received within the period of time provided. If the second data is not received during this period, step 235 is performed. If the second data is received during this period, step 220 is performed. In one embodiment, the second data includes information received from the key device. For example, this information may uniquely identify the user such that information regarding the usage and activities performed by this user may be recorded on the secured device.

In step 220, at least one expected result is computed using the appropriate algorithm(s) applied to the first data. Multiple expected output data values (the result of a corresponding algorithm applied to the same input data) are associated with different security levels.

In step 225, the second data is compared to each of the at least one expected results.

In step 230, if the second data does not match any one of the at least one expected results, step 235 is performed. If the second data and one of the at least one expected results match, step 240 is performed.

In step 235, the disable signal is deasserted.

In step 240, a security level corresponding to the second data is determined. In one embodiment, the security level is determined by which of the plurality of expected output values matches the second data.

In step 245, the disable signal is asserted. In one embodiment, the disable bus is coupled to a critical component of the secured device to disable its functionality when the disable signal is asserted.

The invention has been described in conjunction with the preferred embodiment. It is evident that numerous alternatives, modifications, variations and uses will be apparent to those skilled in the art in light of the foregoing description.

What is claimed is:

1. A security apparatus interfacing with a first device for preventing unauthorized use of a second device, said security apparatus comprising:

a first circuit configured to generate a first event;

a second circuit configured to provide a first input to said first device in response to each of said first event, to receive a response from said first device in response to said first input, to assert a first signal to disable said second device if said response does not correspond to an expected response, and to provide a level of security corresponding to a value included in the first device; and a third circuit configured to provide a password prompt in response to a second event, to receive a second input from a user interface and to assert a second signal to disable said second device if said second input does not correspond to said password.

2. The security apparatus of claim 1 wherein said first circuit generates a periodic event.

3. The security apparatus of claim 1 wherein said first circuit generates an asynchronous event.

4. The security apparatus of claim 1 wherein said first device is a PC card.

5. The security apparatus of claim 1 wherein said first device is a wireless device.

6. The security apparatus of claim 1 wherein said first device uses a 2-wire protocol.

7. The security apparatus of claim 1 wherein said first device uses parallel port protocol.

8. The security apparatus of claim 1, wherein said second event is generated in response to said second device being powered up.

9. The security apparatus of claim 1 wherein said second circuit further provides information to said first device in response to each said event.

10. The security apparatus of claim 9 wherein said information comprises an identifier corresponding to said second device.

11. The security apparatus of claim 9 wherein said information comprises a description of an activity being performed by said second device.

12. A computer system interfacing with a first device for preventing unauthorized use, said computer system comprising:

a first circuit configured to periodically generate a first event;

a second circuit configured to provide a first input to said first device in response to each of said first event, to receive a response from said first device in response to said first input, to assert a first signal if said response does not correspond to an expected response, and to provide a level of security corresponding to a value included in the first device;

a second device configured to be disabled in response to said first signal; and a third circuit configured to provide a password prompt in response to a second event, to receive a second input from a user interface and to assert a second signal to disable said second device if said second input does not correspond to said password.

13. The security apparatus of claim 12 wherein said first circuit generates a periodic event.

14. The security apparatus of claim 12 wherein said first circuit generates an asynchronous event.

15. The computer system of claim 12 wherein said first device is a PC card.

16. The computer system of claim 12 wherein said first device is a wireless device.

17. The computer system of claim 12 wherein said first device uses a 2-wire protocol.

18. The security apparatus of claim 12 wherein said first device uses parallel port protocol.

19. The computer system of claim 12, wherein said second circuit further provides information to said first device in response to each said event.

20. The computer system of claim 12 wherein said second circuit further provides information to said first device in response to each said event.

21. The computer system of claim 20 wherein said information comprises an identifier corresponding to said second device.

22. The computer system of claim 20 wherein said information comprises a description of an activity being performed by said second device.

* * * * *